United States Patent
Ohrem et al.

(10) Patent No.: US 10,618,790 B2
(45) Date of Patent: Apr. 14, 2020

(54) METHOD FOR OPTIMIZING THE FILLING OF A CONTAINER

(71) Applicant: KHS GmbH, Dortmund (DE)

(72) Inventors: Jochen Ohrem, Bad Kreuznach (DE); Ludwig Clüsserath, Bad Kreuznach (DE)

(73) Assignee: KHS Gmbh, Dortmund (DE)

( * ) Notice: Subject to any disclaimer, the term of this patent is extended or adjusted under 35 U.S.C. 154(b) by 90 days.

(21) Appl. No.: 16/089,817

(22) PCT Filed: Apr. 25, 2017

(86) PCT No.: PCT/EP2017/059775
§ 371 (c)(1),
(2) Date: Sep. 28, 2018

(87) PCT Pub. No.: WO2017/186708
PCT Pub. Date: Nov. 2, 2017

(65) Prior Publication Data
US 2019/0127198 A1    May 2, 2019

(30) Foreign Application Priority Data
Apr. 29, 2016   (DE) .................. 10 2016 108 053

(51) Int. Cl.
*B67C 3/28* (2006.01)
*G05B 13/02* (2006.01)
*B65B 3/22* (2006.01)

(52) U.S. Cl.
CPC ................ *B67C 3/287* (2013.01); *B65B 3/22* (2013.01); *B67C 3/282* (2013.01); *B67C 3/286* (2013.01); *G05B 13/0265* (2013.01)

(58) Field of Classification Search
CPC ......... B67C 3/287; B67C 3/282; B67C 3/286; B67C 3/2637; B67C 3/2617; B65B 3/22; G05B 13/0265
See application file for complete search history.

(56) References Cited

U.S. PATENT DOCUMENTS

| | | | | |
|---|---|---|---|---|
| 7,376,472 | B2 * | 5/2008 | Wojsznis | G05B 13/048 700/29 |
| 8,875,752 | B2 * | 11/2014 | Monzel | B67C 3/30 141/196 |
| 2011/0303322 | A1 * | 12/2011 | Clusserath | B67C 3/04 141/8 |

FOREIGN PATENT DOCUMENTS

| | | | |
|---|---|---|---|
| DE | 197 14 254 | 9/1998 | |
| DE | 103 41 762 | 4/2004 | |
| DE | 10 2008 016 846 | 10/2009 | |
| DE | 102009016084 A1 * | 5/2011 | ............... B67C 3/04 |
| DE | 10 2010 006005 | 7/2011 | |

(Continued)

*Primary Examiner* — Timothy L Maust
*Assistant Examiner* — Christopher M Afful
(74) *Attorney, Agent, or Firm* — Occhiuti & Rohlicek LLP

(57) ABSTRACT

A container-filling method includes executing a learning phase by starting a filling operation with a filling parameter that was used to start filling of a another product. The learning phase includes the filling element and saving relationships between a filling parameter, such as expected filling time or foam formation, and a value indicative of that filling parameter. The method includes comparing a saved target with this value to see a termination criterion has been achieved. If not, the filling parameter is varied in response to instructions provided by a simulator and the process repeated.

18 Claims, 7 Drawing Sheets

(56) References Cited

FOREIGN PATENT DOCUMENTS

| DE | 10341573 B4 * | 9/2016 | ............. G05B 11/32 |
|----|---------------|--------|--------------------------|
| DE | 10362408 B3 * | 6/2017 | |
| EP | 2 975 486 | 1/2016 | |
| WO | WO92/02866 | 2/1992 | |
| WO | WO2010/112143 | 10/2010 | |

* cited by examiner

METHOD FOR OPTIMIZING THE FILLING OF A CONTAINER

RELATED APPLICATIONS

This is the national stage of international application PCT/EP2017/059775, filed on Apr. 25, 2017, which claims the benefit of the Apr. 29, 2016 priority date of DE102016108053.5, the contents of which are herein incorporated by reference.

FIELD OF INVENTION

The present invention relates to mass production of beverages and in particular, to filling containers.

BACKGROUND

When filling a container with a product, it is desirable to fill the container as quickly as possible. However, if the product is carbonated, the product will tend to foam if filled too quickly. This phenomenon is familiar to anyone who has poured beer into a glass too quickly.

One can reduce foaming by filling more slowly. However, this means it takes a long time to fill a container.

SUMMARY

It is object of this invention to create a method that permits a more efficient filling of different products.

The present invention relates to a method for optimizing the filling of a container, and in particular containers for beverages. Such containers include, for example bottles, such as PET bottles, cans or kegs. The maximum filling rate that can be achieved during the filling of the product depends on different factors, such as density and viscosity of the product and its carbon dioxide content.

According to the invention, an optimization method is carried out with a learning phase that has eight steps.

The first step is to set a starting value for at least one filling parameter. A useful filling parameter is a filling rate. The starting value is a starting value of the same filling parameter for a similar product. The second step is to use this set filling parameter to begin filling a container with the product. During this step, measurement indicative of attaining a target value also occur. Examples of a value occur for comparison with a target value. Examples of a target value include the duration of the filling operation, preferably until the product in the container has calmed, and the level of foaming associated with the set filling parameter.

The third step is to capture and save the filling parameter that is being used and the measured value in a data model that simulates the behavior of the filling element when filling a container with the relevant product.

The fourth step is to evaluate the saved target value using an evaluation function in an attempt to obtain a best target value.

The fifth step is, if a termination criterion has been achieved, executing the seventh step without having executed the sixth step.

The sixth step is to vary the filling parameter and return to the second step. Varying the filling parameter includes varying it in response to instructions provided by a filling-element simulator.

The seventh step comprises causing the filling-element simulator to learn that the filling parameter is an optimal filling parameter for the product.

The eighth step is to use the optimal filling parameter during the filling of the product in a filling machine.

The termination criterion is defined for example by the expiration of a certain period of time, or when a certain quality of the target value is reached, or upon a certain convergence of the target value after several optimization rounds b) to f).

For as long as the termination criterion is not reached, the self-learning algorithm varies the filling parameter based in part on the data model. After such variation, the procedure continues with a return to the second step.

The foregoing method allows the filling operation for a product to be optimized, i.e. in particular the time progression of the filling rate or the time progression of the setting and/or lift of the filling valve, thereby allowing the optimization of filling rate profiles and hence an optimized regulating of the control valves/filling valves of the filling elements of a filling machine during the filling process, ultimately achieving a reduction in process time.

The product-specific and, if applicable, machine-specific optimized filling parameter can then be stored in the data model. The data model can, for example, lie in a memory of the controller of a laboratory filling system in which optimization tests for the filling operation of a new product are conducted. In some embodiments, the data model is a filling-element simulator.

Target values and corresponding optimal filling parameters, or generally the data of the data model or the data model itself, can also be stored in a data cloud so that a bottler or drink manufacturer will have global access to these values. Both can therefore access previously optimized filling parameters when filling an already-known product. Both can also access the optimized filling parameters to be used as a starting point when a new product with similar properties is to be bottled. Thus the invention permits a very rapid and effective optimization of the filling operation not just for known products but for new products as well.

In some practices, it is the filling rate or setting of the filling valve/control valve that is optimized as the filling parameter, in particular the latter's time progression over the time of the filling operation, from first opening the filling valve at the commencement of the filling process to closing the filling valve at the end of the filling process.

In an advantageous embodiment of the invention, the optimal filling parameter(s) of the product, together with its product parameters, are saved in the data model and associated with each other so as to make it easy to generate filling parameters for products having similar product parameters. This allows a rapid calculation and optimization of filling parameters of new products.

Some practices rely on a self-learning algorithm, for example an evolutionary algorithm that provides self-learning structures. An example of such an algorithm is one implemented as a neural network. Such a self-learning algorithm develops a certain cognitive ability and so can substantially simplify or accelerate the optimization of at least one filling parameter of the product.

Starting from a conventionally-shaped Venturi nozzle, it is possible to create variations with sections having different bores and diameters. Through the random combination of these sections and the determination of performance for each such combination, after a manageable number of new combinations of the sections, it is possible to find a form whose performance and/or efficiency is significantly superior to those of a conventional Venturi nozzle. The form of this new high-performance nozzle was not predictable nor could it be calculated at that time.

If a new arrangement results in superior properties, then that arrangements can be a candidate for being used as the starting point for further changes to the arrangement. But if a new arrangement leads to inferior properties, then the changes that have led to that new arrangement are rejected.

Parameters of a product include drink concentrate content or syrup content, temperature of the product, the type of drink concentrate, the product's viscosity, the product's density, the product's carbon-dioxide content and/or the solubility of carbon dioxide in the product, and the proportion of certain soluble or insoluble drink components.

If the individual product parameters exercise influences of different strengths on the product's filling properties, then it is preferable to allow for these different weightings in the algorithm using appropriate weighting factors.

The use of the data model simplifies the determination of those properties of the product that are important for its filling behavior. An example of such a property, based on the data model, is the product's viscosity. The viscosity turns out to have a significant influence on the filling rate as the product flows through the filling valve.

When determining a starting value of a filling parameter for a new product, or to determine the optimal time progression of that filling parameter, it is particularly useful to retrieve an associated filling parameter for at least one similar product to be used as the starting value in the first step. Doing so makes it more likely that one is at a starting point in the optimization method that is relatively close to the end point, thus making it more likely that the optimized filling parameter and its progress through time will be arrived at quickly. Alternatively, it is possible to use default values known from experience.

Some practices include optimizing several filling parameters. These are typically optimized serially rather than in parallel to avoid undue complexity. In such cases, some practices feature optimizing a filling parameter again since its optimal value may have been displaced slightly as a result of changes to other filling parameters.

To determine a further filling parameter, after the seventh step, the process returns to the first step with a further or new filling parameter being optimized in another execution of the first through seventh steps. This procedure can be carried out multiple times to optimize as many different filling parameters as one wishes.

In some cases, a data model assumes a first temperature whereas actual filling is carried out at a second temperature.

In such cases, it is possible to correct the data model based on known dependence on temperature. Thus, in some cases, it would be possible to transform an optimized filling progression curve at 25° C. into an optimized filling progression curve at 20° C. without the need for a separate optimization process. However, in other practices, it is simpler to carry out a separate optimization process in which a different temperature being assumed.

Although it is usually the filling rate or the time progression of the filling rate or the filling valve setting that is used as the filling parameter to be optimized, other filling parameters can also be optimized. Examples of such filling parameters that are subject to optimization include filling time, temperature, filling pressure, filling level of the product in the filled container, and carbon-dioxide released during filling.

In some practices, the variation of a filling parameter during the course of optimization encompasses only the value of the filling parameter. In other practices, the variation of a filling parameter during the course of optimization encompasses the time progression of the filling parameter. In yet other practices, the variation of a filling parameter during the course of optimization encompasses both the value of the filling parameter and the time-variation in that value. Thus, there exist practices of the invention in which the filling rate is the filling parameter that is varied and the filling-rate profile, which reflects the variation in filling rate over time, is optimized.

It is possible to infer the filling behavior of a product from a filling-rate profile relative quickly. It is also easy for the data model to process and evaluate a filling-rate profile. For example, certain features such as points of inflection, maxima, and minima, both of the filling profile and its derivatives, are available to be used as characteristics for the filling behavior. These characteristics can be stored and later used in a filling process.

In another aspect, the invention features a computer-readable medium having encoded thereon instructions for causing a computer to execute the foregoing method. An example of a computer-readable medium would be a working memory of a computer that is or can be connected to a filling machine's controller.

A computer located at a laboratory at which a test filling-system carries out filling tests can be used to load a data model into a data cloud, together with optimal filling parameters, so that controllers from filling machines at other locations will have access to that data model and to those filling parameters. This permits those filling machines to use the optimized filling-parameters to carry out batch filling with corresponding products. This promotes the ability to have a standardized and optimized filling process, which results in repeatable drink quality.

Another aspect of the invention features optimizing the filing rate or the filling-rate profile of a filling process during a learning phase or training phase that relies on an evolutionary algorithm to search for an optimal filling rate of profile. In such cases, optimization results in the minimization of foaming that occurs during or upon completion of filling. The foam itself can be detected using a camera and image-processing software or using electrical contacts.

An apparatus according to the invention, with its ability to vary filling rate during the filling process in an optimized way, provides a way to fill many different products into containers with minimal foaming.

It is also possible to optimize filling rate with an objective other than minimizing foam. For example, one may choose to optimize filling rate with the objective of extending a filling valve's service lifetime. This is not an unreasonable objective because repair and replacement of the various components of a filling valve, particularly components such as gaiters, which wear out quickly, is expensive and time-consuming not only because of the parts and labor involved but on the need to halt production while a repair is being made.

The approach described herein, with its centralized testing and widespread distribution of optimal filling parameters, is particularly beneficial to large beverage manufacturers that bottle drinks of all different types all over the world and that are constantly bringing new drinks to the marketplace.

Another aspect of the invention features the use of an automated mechanism for optimizing a filling-rate profile. Such mechanisms include neural networks or the use of a reference trajectory. In some practices, a self-learning algorithm approaches an optimum by changing weights of various parameters and adapting to certain threshold values.

In a particular implementation, the learning phase includes a first through fifth steps and is repeated numerous times.

The first step is a prediction step. This step includes deriving a prediction from similar drinks that have been filled into similar containers with filling valves. Such data would be globally available because it has been stored in the cloud. Examples of such data include process data, drink parameters, and equipment parameters. Examples of process data include filling-rate profile, pressure, temperature, and the like. Examples of drink parameters include carbon dioxide content, viscosity, density, and constituents. Examples of equipment parameters include the type of filling valve.

A suitable database belonging to the drink manufacturer and having the foregoing data can be used from any location in the world. The database can constantly be updated and expanded as additional data becomes available.

Although the prediction step promotes more rapid optimization, it is not required. If no database is available, the learning phase begins with the second step.

The second step is a filling and testing step in which filling is carried out beginning with certain initial filling parameters. These initial filling parameters can come from the first step or can be supplied externally.

The third step is a measuring and detecting step. In this step, a sensor provides some measure of how closely the filling procedure is matching some expectation. For example, a timer may be measuring the elapsed filling time or an optical sensor, such as a camera or electrical contacts, may be observing foaming.

The fourth step is an analysis step. The analysis step includes analyzing the relationships between the filling parameters and the quantity being measured or provided by the sensor.

The fifth and final step is a step of varying or adjusting the filling parameter. This is carried out either based on data stored in the database or arbitrarily, using an evolutionary algorithm to filter out variations that are not successful. If the variation results in an improvement, the variation is retained as the new filling parameter and the second through fifth steps are repeated. The fifth step also includes creating a data model with associated target values and optimized filling parameters, with one data model for each combination of beverage variety, container type, and filling valve.

Some practices include storing beverage-specific data in a cloud database as part of the data model. This makes filling parameters for existing combinations available for use in optimizing filling parameters for new products. The data model provides a model that correlates the type of beverage with the filling parameters of different products and possibly taking account of different kinds of filling elements, filling valves, and filling machines. In some practices, the model is a self-learning model.

In some embodiments, a control circuit integrates the velocity of the product during the filling process to provide a way to control velocity based at least in part on viscosity. Other embodiments automatically set filling rates for different products during the course of the filling operation using a self-learning algorithm.

In some practices, certain characteristics such as turning points, points of inflection, and times until reaching a maximum flow rate are used as essential points during a filling-parameter optimization procedure. This optimizes, and in particular, accelerates the filling operation by reducing or minimizing foaming.

The invention further includes practices that combine any of the aforementioned techniques.

The procedures and systems described herein are only the non-abstract procedures and systems. The descriptions of abstract procedures and systems have been omitted. As such, the claims are supported only by a description of a non-abstract implementation. The claims shall not be construed to cover an abstract implementation of either method or system. Therefore, anyone who regards the present specification and claims as covering abstract subject matter would be mistaken. As used herein, a non-abstract method or system is one that covers statutory subject matter under 35 USC 101 as of the filing date of this application.

The apparatus and methods described herein provide an improvement in a particular technology, namely filling technology. The improvement lies in being able to optimize foam formation or duration of the filling operation.

The apparatus and methods described herein are analogous to the use of the Arrhenius equation to open a rubber press. Although some mathematical operations are carried out in the procedure, these procedures rely on a sensor, such as a foam sensor, and are used to open a valve. This is no different, fundamentally, from relying on a temperature sensor to open a rubber press.

BRIEF DESCRIPTION OF THE DRAWINGS

These and other features of the invention will be apparent from the following detailed description and the accompanying figures, in which.

DETAILED DESCRIPTION

Figure 1:
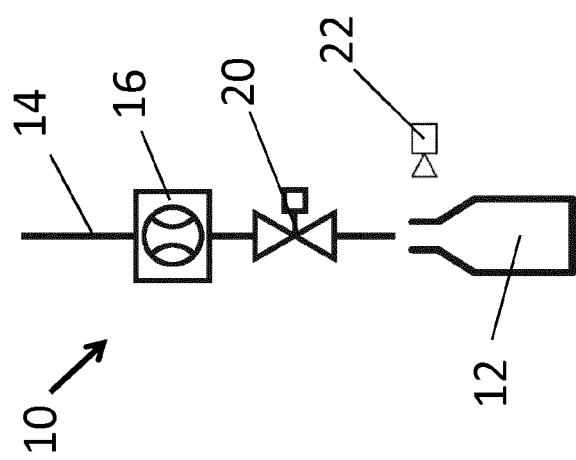
FIG. 1 shows a filling valve used in a filling machine for filling a container with a beverage.

FIG. 1 shows a filling element 10 used by a filling machine for filling a container, such as a bottle 12. The filling element 10 includes a product channel 14 along which are disposed a flow meter 16 and a filing valve 20. Although the flow meter 16 is shown upstream of the filling valve 20, in some embodiments the flow meter 16 is downstream of the filling valve 20.

The filling element 10 also includes an optical sensor 22. The optical sensor 22 senses foam formation during filling.

The flow meter determines the volume of product flowing through the channel 14 during filling. In some embodiments, the flow meter is a magnetically inductive flow meter. A load cell and/or a liquid level sensor can also be used instead of a flow meter 16.

Opening and closing the filling valve 20 regulates the filling rate over time. The filling valve 20 can be an open/close filing valve, a two-stage filing valve, or a control-filling valve.

Figure 2:
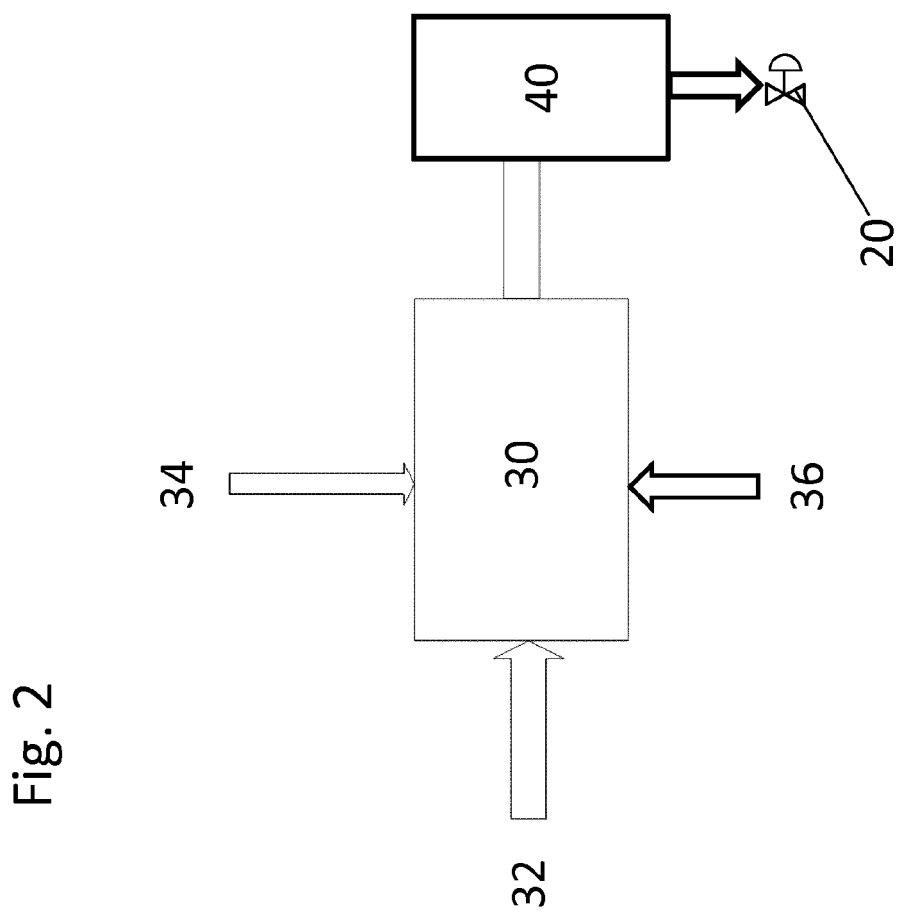
FIG. 2 shows a self-learning controller for controlling the filling valve shown in FIG. 1.

FIG. 2 shows a self-learning controller 30 in communication with a data model 40. The self-learning controller 30 receives signals indicative of target values 32, measured product parameters 34, and known product parameters 36. Based at least in part on these signals, the self-learning controller 30 outputs a control signal for controlling the filling valve 20.

The self-learning controller 30 controls one or more filling parameters for a particular product that is being filled. It does so in an attempt to attain a specified target value. A filling parameter that comes closest to attaining the specified target value is the optimal filling parameter. Accordingly, the self-learning controller 30 is optimizing the filling parameter in an attempt to discover and use the optimal filling parameter.

Examples of filling parameters that the self-learning controller 30 attempts to optimize include the rate at which the filling rate changes over time and parameters that affect that rate. These filling parameters can pertain to filling rate, filling level, foam formation, or filling time.

Examples of target values include: a desired filling time for the filling operation, a desired extent of foam formation, and a desired height of the filling material in a filled container.

Examples of product parameters include: the product's viscosity, its temperature, its carbon dioxide content, and its constituent ingredients.

The self-learning controller 30 begins with a starting value for a filling parameter. As time passes, the self-learning controller 30 adaptively changes the value of the filling parameter in an attempt to attain the target value. In some examples, the target value is an extent to which foam formation is to be reduced. In others, that target value is a time required for filling. What is important is that there be a relationship between the value of the filling parameter and attainment of the target value.

The known product-parameters 36 provide a basis for choosing an initial value of the filling parameter. The data model 40 stores these known product-parameters. As a result, the self-learning controller 30 will have the known product-parameters available for use as a basis for developing a model for simulating the filling process. This enables the self-learning controller 30 to rapidly optimize the filling parameters that are needed for batch filling, and in particular, the setting the filling valve 20 during a filling operation for a particular product.

The self-learning controller 30 ultimately defines a time-varying control signal that controls the setting of the filling valve 20. This results in a time-varying filling-valve setting that can be used for all filling elements 10 used by the bottler, including those that are on another filling machine. This makes it possible to share the relevant time-varying filling-valve setting with other filling machines through the cloud. As a result, all filling elements 10 that are filling the same product all over the world will be able to use the same time-varying filling-valve setting. This repeatability promotes a more consistent quality even across different filling elements 10.

In FIG. 2, the self-learning controller 30 uses the filling valve 20 as an actuator and uses a measurement of foam content by the sensor 22 as a basis of feedback. The foam content ultimately depends on such factors as carbon dioxide content, viscosity, and temperature and pressure of the various constituents of the drink.

A sensor 22 observes the foam. In some embodiments, the sensor 22 is a camera. In others, the sensor 22 comprises plural electrical contacts. In either case, the sensor 22 provides a basis for adaptively deriving a time-varying signal for the filling valve 20.

Figure 3:
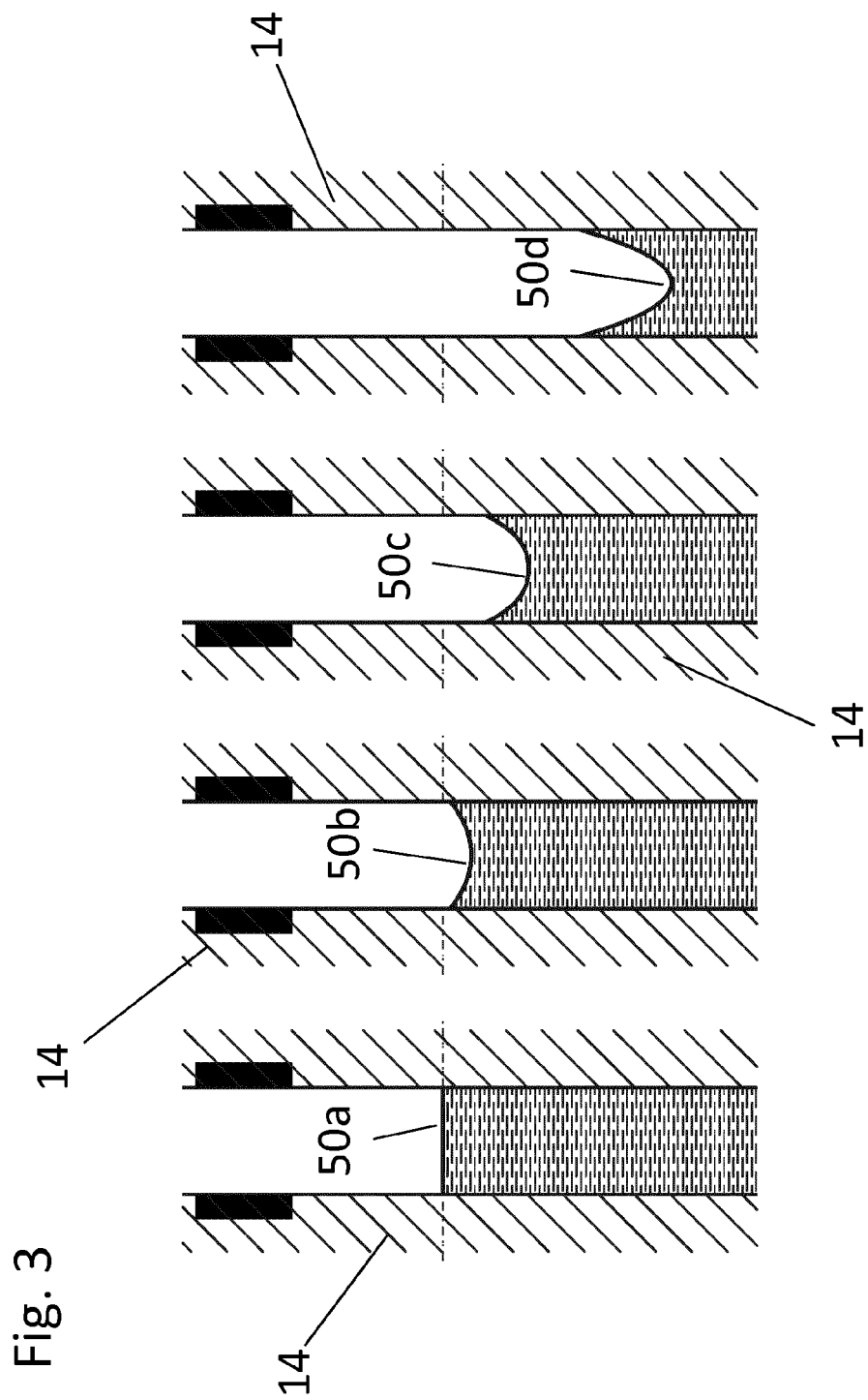
FIG. 3 shows the theoretical beverage-level in the product channel of the filling element shown in FIG. 1 at several times during a filling process.

FIG. 3 shows first through fourth product surfaces 50a-50d in the product channel. These product surfaces 50a-50d correspond to particular milestones during the filling operation.

The first product surface 50a is that which exists prior to the start of the filling operation. At this stage, the product surface is level. The interface between liquid and gas is square to the wall of the product channel.

The second product surface 50b corresponds to the case in which the filling valve 20 has just been opened. In this case, product has begun to accelerate out of the product channel 14. Because the velocity profile for flow through a channel tends to have zero velocity at the wall and a maximum in the center, the second product surface 50b develops a slight convex indentation. The exact shape of this convex indentation depends on the acceleration and velocity of the product in the channel 14 as well as on known product-parameters. These known product-parameters are connected with certain material properties, such as viscosity and its extent of adhesion to the walls of the product channel 14.

As the product's flow velocity increases, the profile product surface transitions into an ellipse, as shown in the third and fourth product levels 50c, 50d.

FIG. 3 thus illustrates how product parameters, such as for example density, the shear effect of the product channel's wall, the product's viscosity, and the product's adhesion to product channel 14 interact with such features as the product channel's diameter and the shape of the product channel 14 and the filling valve 20.

The flow characteristics at the start of the filling process, once they have been correlated with viscosity and with the product's acceleration through the filling valve 20, are then made available to the self-learning controller 30. The self-learning controller 30 then uses these flow characteristics, suitably correlated, to optimize the filling parameter.

The end result of the self-learning controller's self-learning process is a container-dependent rate profile in which the amount of liquid that has entered the container determines the flow rate into the container.

The optimal flow rate as a function of time can include some surprises that would not be intuitively obvious.

For example, in the table shown herein, the first two milliliters are filled with a flow rate of 50 milliliters per second. But the next three milliliters are filled at a much slower rate of only two milliliters per second. Then, for the next five milliliters, the filling rate jumps by two orders of magnitude.

| Filling quantity [ml] | Flow rate [ml/s] |
|---|---|
| 0-2 | $V_0 = 50$ |
| 2-5 | $V_1 = 2$ |
| 5-10 | $V_2 = 250$ |
| 10-20 | $V_3 = 100$ |
| 20-25 | $V_4 = 322$ |
| 25-45 | $V_5 = 127$ |
| 45-60 | $V_6 = 322$ |
| 60-420 | $V_7 = 255$ |
| 420-425 | $V_8 = 3$ |
| 425-440 | $V_9 = 11$ |
| 440-500 | $V_{10} = 42$ |

Most people would use a steady pour to fill a container manually. In some cases, people would manually fill a container with a flow rate that varies smoothly. However, there is nothing intuitive about a jagged filling profile such as that listed in the table or shown in FIGS. 4 and 5. Nor is there any obvious physical explanation based on known principles of fluid dynamics. Thus, no human would have envisioned that such an apparently spastic way of pouring could possibly be optimal for filling a container.

It is apparent, therefore, that the filling profiles that are derived as optimal by the self-learning algorithm are not something that one could possibly have been derived independently of using the control system as described herein.

Figure 4:
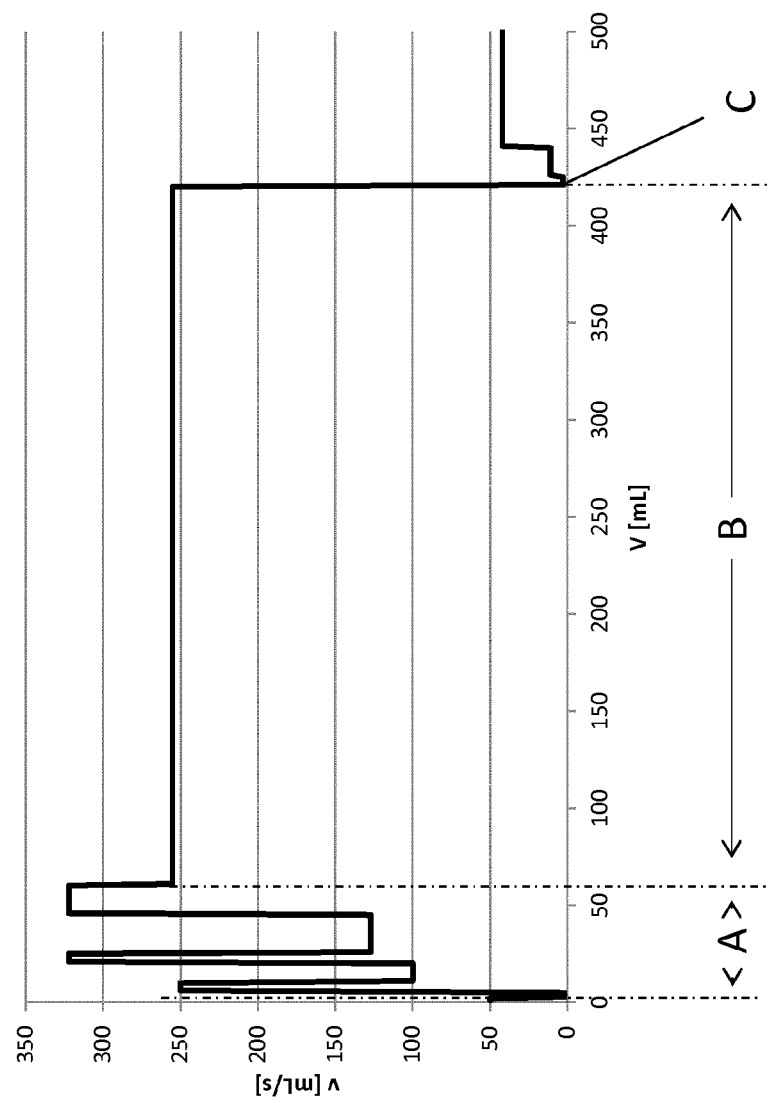
FIG. 4 shows an optimized flow-rate as a function of time as derived by the self-learning controller of FIG. 2.

Contrary to one might expect, FIG. 4 shows that the optimal flow rate as having an initial region "A" during which the flow rate varies widely. Then, in a subsequent filling phase "B", the optimal flow rate becomes constant over an extended period until closing the filling valve 20 at point "C."

Figure 5:
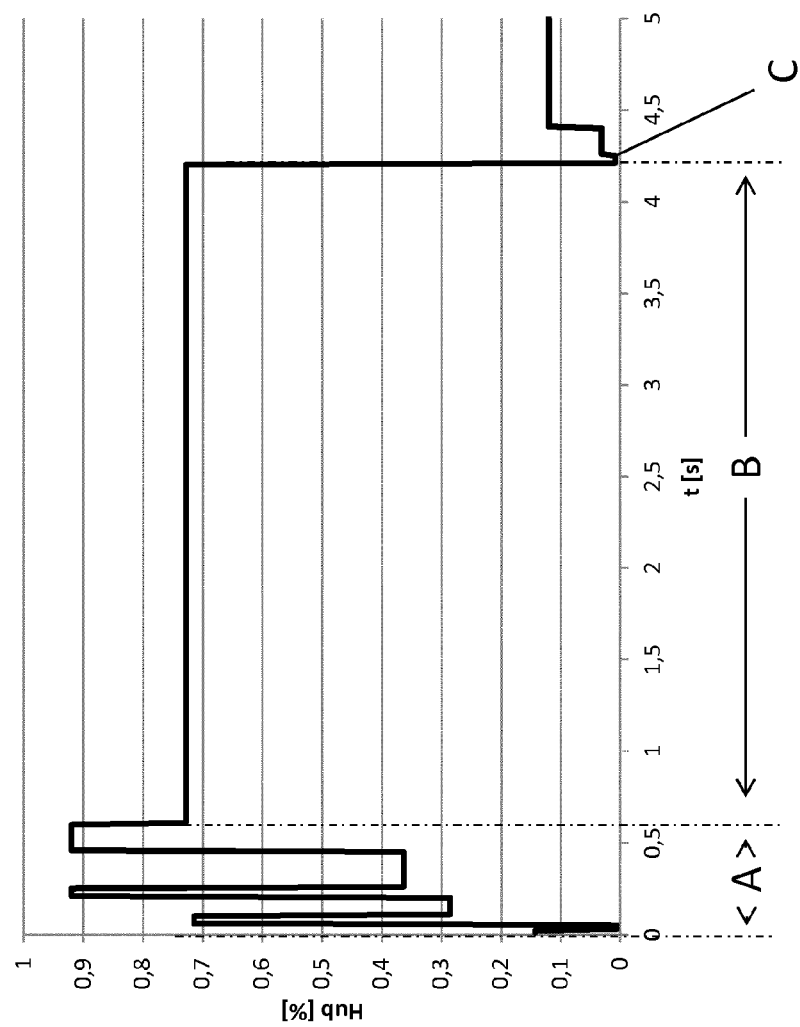
FIG. 5 shows the percentage by which the control valve of the filling element shown in FIG. 1 is open to cause the flow-rate profile shown in FIG. 4.

FIG. 5 shows vertical stroke of the filling valve 20 as a function of time. This provides another way to look at the data in FIG. 4. By suitable change-of-variables, it is possible to optimize the stroke as a function of time instead of volume rate-of-flow or mass rate-of-flow.

Since it is not necessary to determine volume flow, it is possible to omit a flow meter 16 from the filling element 10 and to instead use a filling-level sensor, such as a camera or an electrical contact. Alternatively, it is possible to use a load cell instead of a flow meter 16. These filling parameters can generally be derived from one another by calculation.

Figure 6:
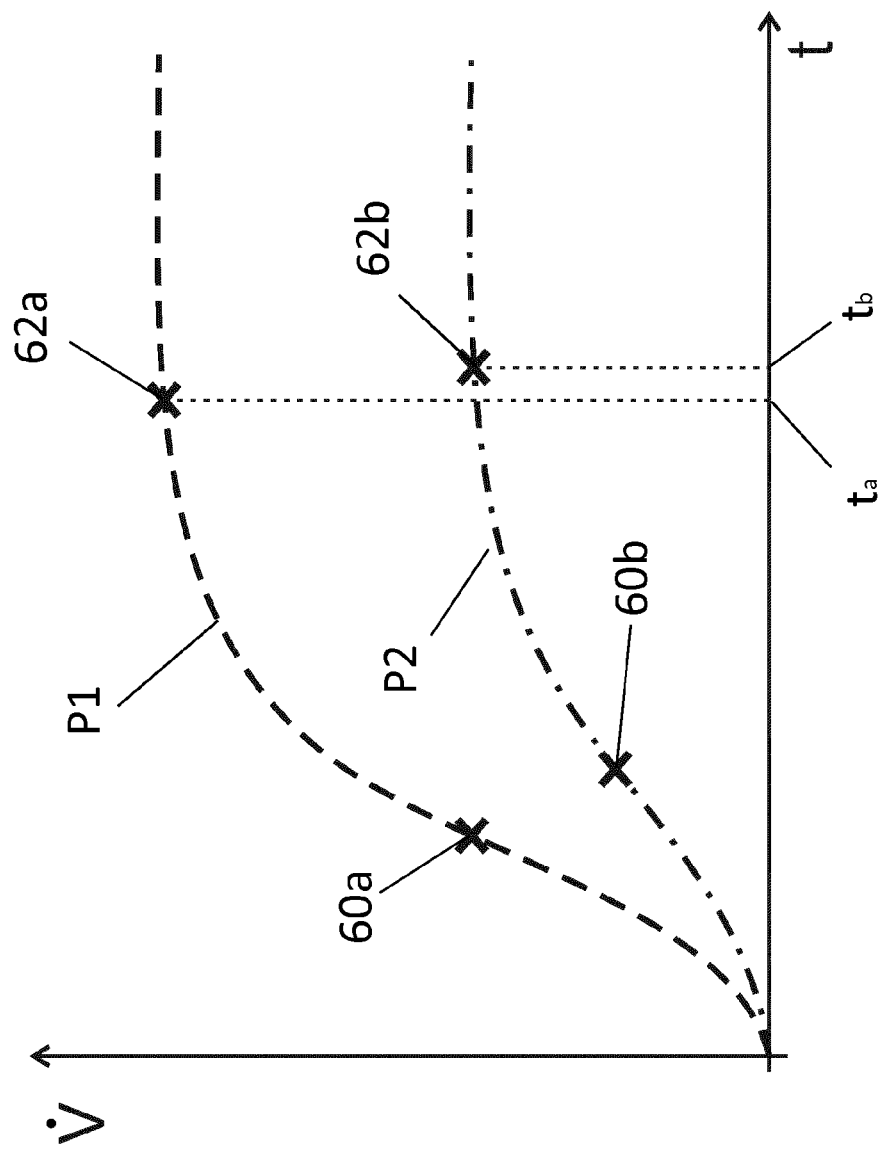
FIG. 6 shows the amount of volume in the container as a function of time when using the filling profiles shown in FIGS. 4 and 5.

In FIG. 6, a first filling curve P1 shows the amount of a first product that has entered a container and a second filling curve P2 shows the amount of a second product that has entered another container. The first and second filling curves P1, P2 have inflection points 60a, 60b that indicate a change in flow rate and endpoints 62a, 62b that indicate the end of the filling process at end times $t_a$, $t_b$.

Figure 7:
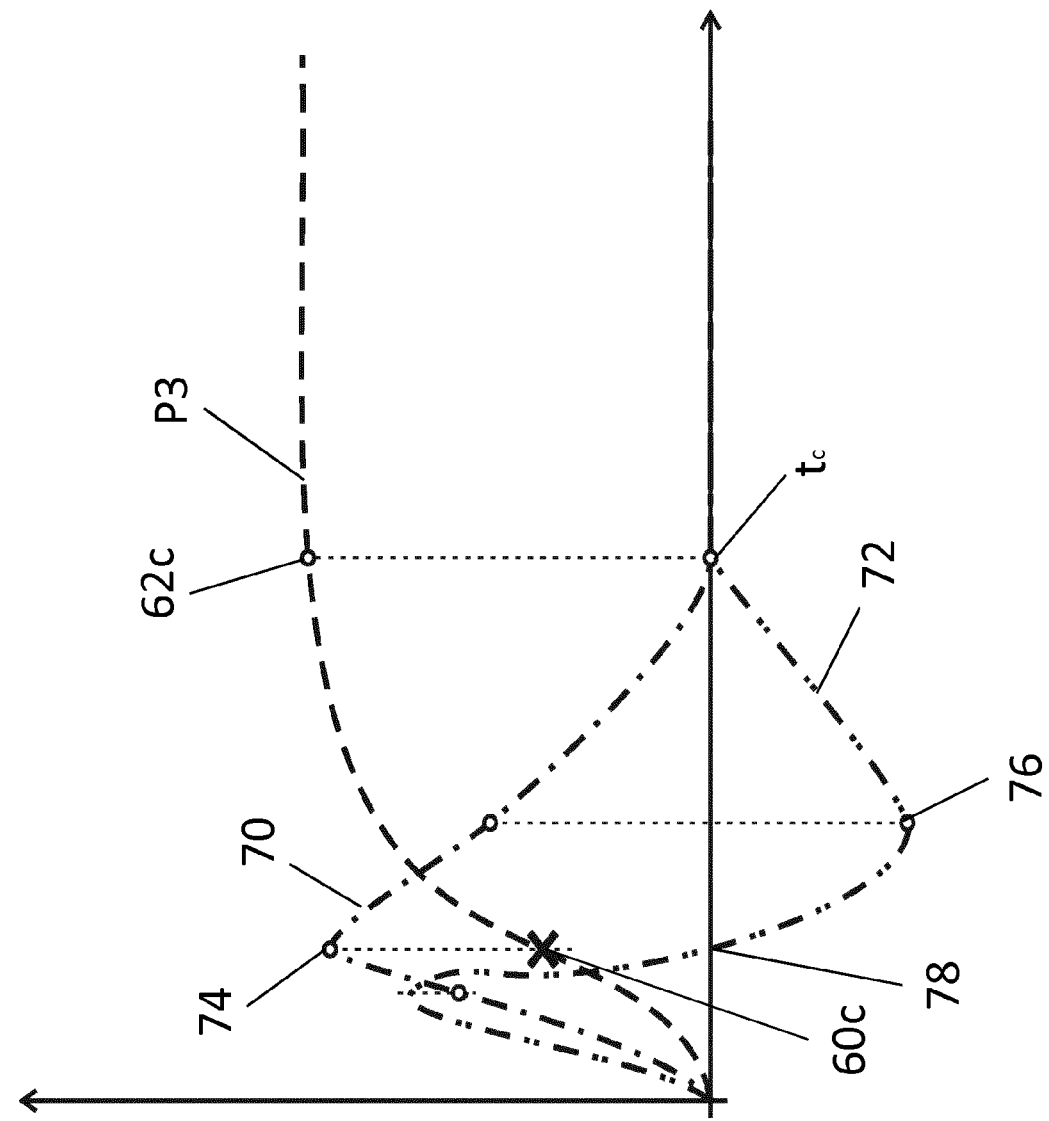
FIG. 7 shows the capture of characteristic values from the first and second derivatives of the optimized flow-rate in FIG. 4.

FIG. 7 shows a third filling curve P3 together with first and second derivatives 70, 72 thereof.

The first derivative 70, which defines the flow rate of the product through the product channel 14, reaches a flow-rate maximum 74 at an inflection point 60c of the third filling curve P3. Beyond this flow-rate maximum 74, the flow rate then steadily decreases until it reaches zero at the end $t_c$ of the filling process.

The second derivative 72 describes control pulses for causing the filling valve 20 to either open or close. A positive value of the second derivative 72 indicates that the filling valve 20 is to be opened and a negative value of the second derivative 72 indicates that the filing valve 20 is to be closed.

As is apparent from FIG. 7, a zero crossing 78 of the second derivative 72 corresponds to a maximum value 74 of flow rate. The minimum value 76 of the second derivative 72 marks the time at which the filing valve 20 has been closed to the greatest extent possible. Based on the first and second derivatives 70, 72 the flow-rate maximum 74, the minimum value 76 of the second derivative, and the zero crossing 78, it is possible to derive relevant variables for use in deciding whether to actuate the filling valve 20 and to obtain information about the product flow during the filling operation.

Having described the invention and a preferred embodiment thereof, what is claimed as new and secured by letters patent is:

1. A method comprising using a filling element to fill a first container with a first product, wherein filling said first container with said first product comprises filling said first container through an adjustable control valve in said filling element, said adjustable control valve having a passage cross-section that is controllable to control filling rate during filling, wherein filling said first container further comprises executing a learning phase that comprises first through eighth steps, wherein said first step comprises commencing a filling operation of said first container with said first product by setting, as a filling parameter, a filling parameter that was used to start filling of a second product into a second container using said filling element, wherein said second step comprises, while carrying out said filling operation, obtaining a value, said value thus obtained being an obtained value, wherein said obtained value is selected from the group consisting of an expected duration of said filling operation and an extent of foaming in said container during said filling operation, wherein said third step comprises saving a relationship between said filling parameter and said obtained value, saved relationship being saved in a filling-element simulator that simulates behavior of said filling element for different kinds of products, wherein said fourth step comprises comparing a saved target value with said obtained value to determine whether a termination criterion has been achieved, wherein said fifth step comprises, if a termination criterion is achieved, executing said seventh step without having executed said sixth step, wherein said sixth step comprises varying said filling parameter and returning to said second step, wherein varying said filling parameter comprises varying said filling parameter in response to instructions provided by said filling-element simulator, wherein said seventh step comprises causing said simulator to learn that said filling parameter is an optimal filling parameter for said product, and wherein said eighth step comprises using said optimal filling parameter during filling of said container.

2. The method of claim 1, further comprising storing said optimal filling parameter with product parameters for said first product, wherein said optimal filling parameter provides a basis for estimating a starting filling parameter for a third product that has product parameters within a predefined range of those of said first product.

3. The method of claim 2, further comprising using a self-learning process for selecting said optimal filling parameter as a starting filling rate for said third product.

4. The method of claim 2, wherein said product parameters comprise viscosity, drink-concentrate content, temperature, drink-concentrate type, and carbon-dioxide content.

5. The method of claim 2, further comprising weighing each of said product parameters based on an extent to which said product parameter influences achievement of said termination criterion.

6. The method of claim 2, further comprising, prior to commencing said filling operation, identifying a product that has product parameters within a pre-defined range of those of said first product, thereby defining an identified product, wherein said method further comprises using an optimal filling parameter for said identified product as a filling parameter for commencement of said filling operation.

7. The method of claim 1, further comprising determining a further optimal filling parameter, wherein determining said further optimal filling parameter comprises returning to said first step and optimizing a new filling parameter by executing said second through seventh steps.

8. The method of claim 1, further comprising selecting said filling parameter to be flow rate.

9. The method of claim 1, further comprising selecting said filling parameter to be a setting of said valve.

10. The method of claim 1, further comprising selecting said filling parameter to be an actuation period of said valve.

11. The method of claim 1, further comprising selecting said filling parameter to be a filling level.

12. The method of claim 1, further comprising selecting said filling parameter to be a filling pressure.

13. The method of claim 1, further comprising selecting said filling parameter to be mass rate of flow.

14. The method of claim 1, further comprising varying a time progression of said filling parameter.

15. The method of claim 1, further comprising varying said filling parameter with time.

16. The method of claim 1, further comprising storing said optimal filling rate for said product in a data cloud.

17. The method of claim 1, further comprising storing, in said filling-element simulator, a set of time progressions and maxima thereof, said set of time progressions comprising a filling-rate time-progression, a derivative thereof, and a derivative of said derivative.

18. A manufacture comprising a non-transitory computer-readable medium having encoded thereon instructions for executing the method of claim 1, wherein said instructions, once stored in a memory of a computer that controls a filling machine that comprises said filling element, are executable by said computer.

* * * * *